United States Patent
Hochberg et al.

(10) Patent No.: US 8,340,486 B1
(45) Date of Patent: Dec. 25, 2012

(54) EFFECTIVE $\chi^2$ ON THE BASIS OF ELECTRIC BIASING OF $\chi^3$ MATERIALS

(75) Inventors: Michael Hochberg, Seattle, WA (US); Thomas W. Baehr-Jones, Seattle, WA (US)

(73) Assignee: University of Washington, Seattle, WA (US)

( * ) Notice: Subject to any disclaimer, the term of this patent is extended or adjusted under 35 U.S.C. 154(b) by 196 days.

(21) Appl. No.: 12/796,931

(22) Filed: Jun. 9, 2010

Related U.S. Application Data

(60) Provisional application No. 61/268,187, filed on Jun. 9, 2009.

(51) Int. Cl.
   - G02B 6/00 (2006.01)
   - G02F 2/02 (2006.01)
   - G02F 1/35 (2006.01)

(52) U.S. Cl. .......... 385/122; 359/332
(58) Field of Classification Search .......... 359/326–332; 385/122

See application file for complete search history.

(56) References Cited

U.S. PATENT DOCUMENTS

| | | | | |
|---|---|---|---|---|
| 5,535,001 | A * | 7/1996 | Tajima | 356/477 |
| 7,181,114 | B2 * | 2/2007 | Lee et al. | 385/122 |
| 7,424,192 | B2 * | 9/2008 | Hochberg et al. | 385/122 |
| 7,519,257 | B2 * | 4/2009 | Lipson et al. | 385/126 |
| 7,643,714 | B2 * | 1/2010 | Hochberg et al. | 385/122 |
| 7,970,241 | B2 * | 6/2011 | Chen et al. | 385/2 |

* cited by examiner

*Primary Examiner* — Daniel Petkovsek

(57) ABSTRACT

A method for controlling the nonlinear moments of a nonlinear optical material of an electrooptical device is disclosed. The method includes controlling an optical mode region of the electrooptical device by providing a time varying signal to the electrooptical device via one or more electrodes of the device and affecting the nonlinear moments of the nonlinear optical material of the electrooptical device by providing a time independent bias to the device. In one embodiment, the nonlinear optical material includes a $\chi^3$ material. In another embodiment, the method includes employing the time independent bias to bias the $\chi^3$ material such that the $\chi^3$ material behaves in a manner analogous to a $\chi^2$ material.

15 Claims, 7 Drawing Sheets

FIG. 2A
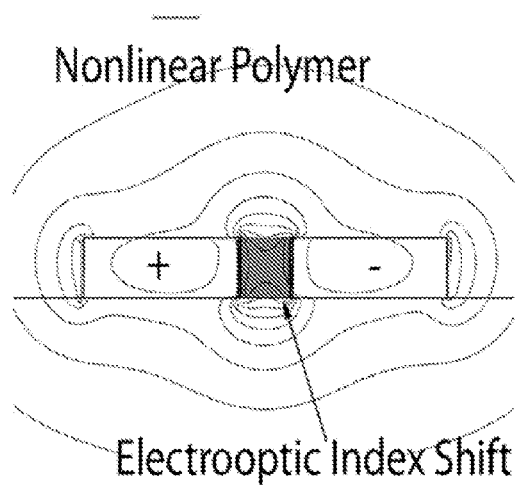
FIG. 2B
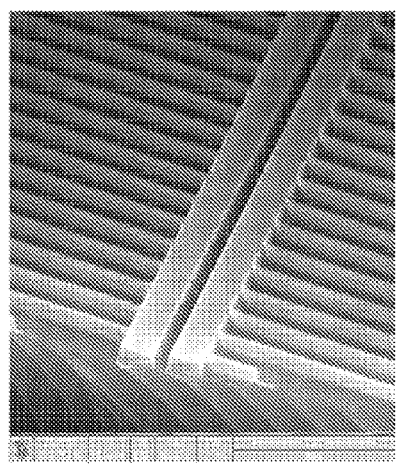
FIG. 2

FIG. 4A
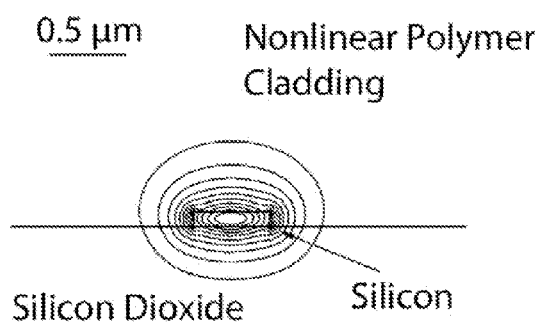
FIG. 4B
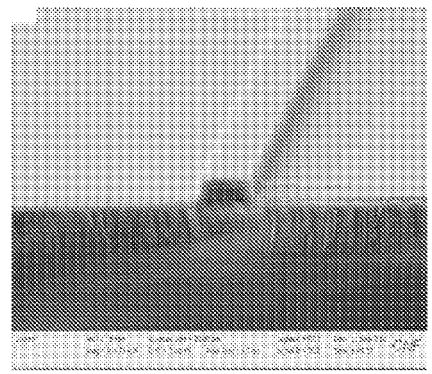
FIG. 4

FIG. 5A
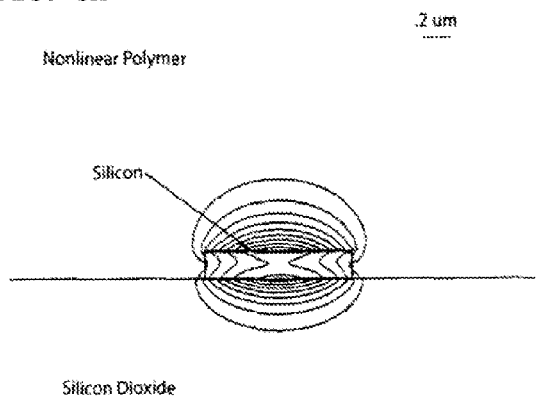
FIG. 5B
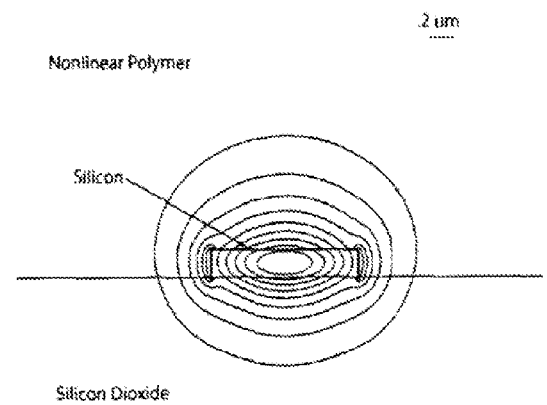
FIG. 5C
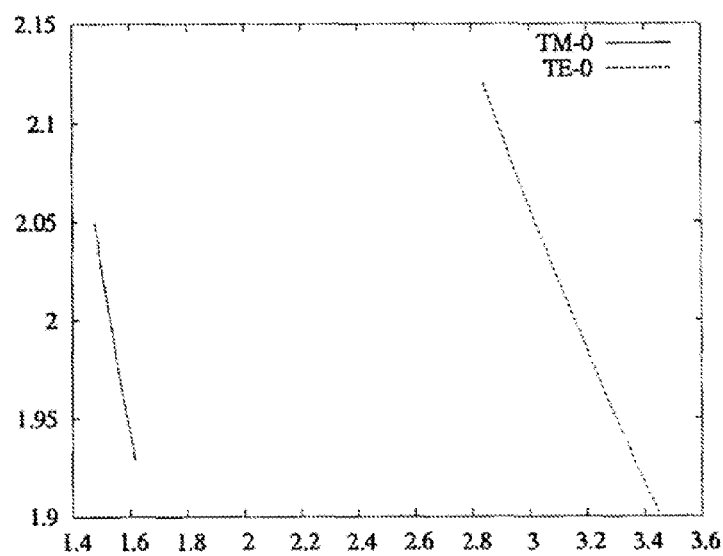
FIG. 5

FIG. 6A
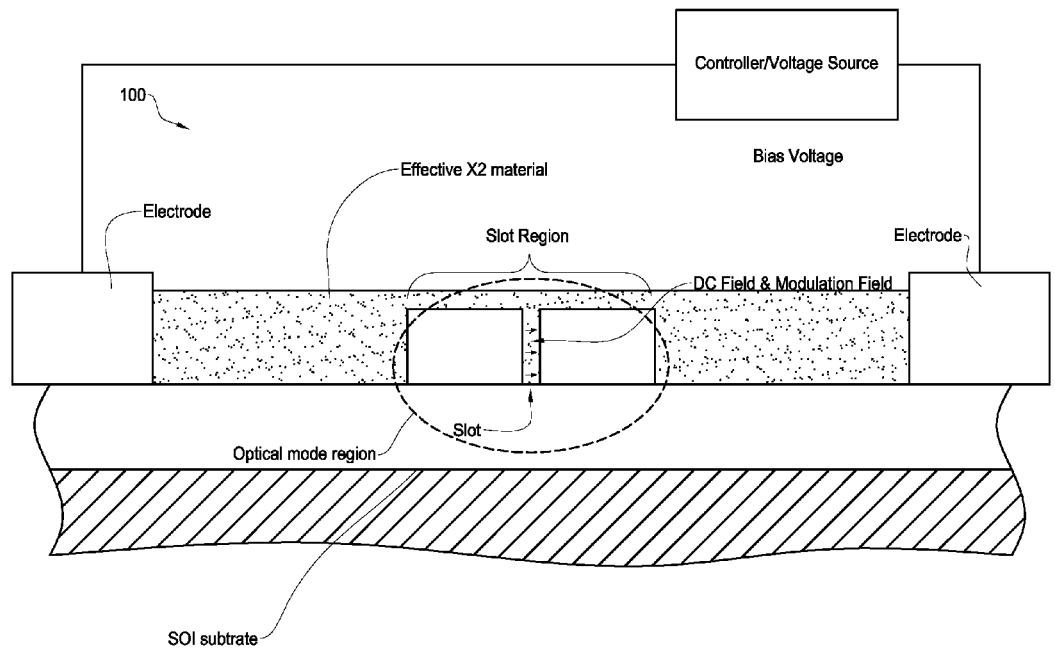
FIG. 6B
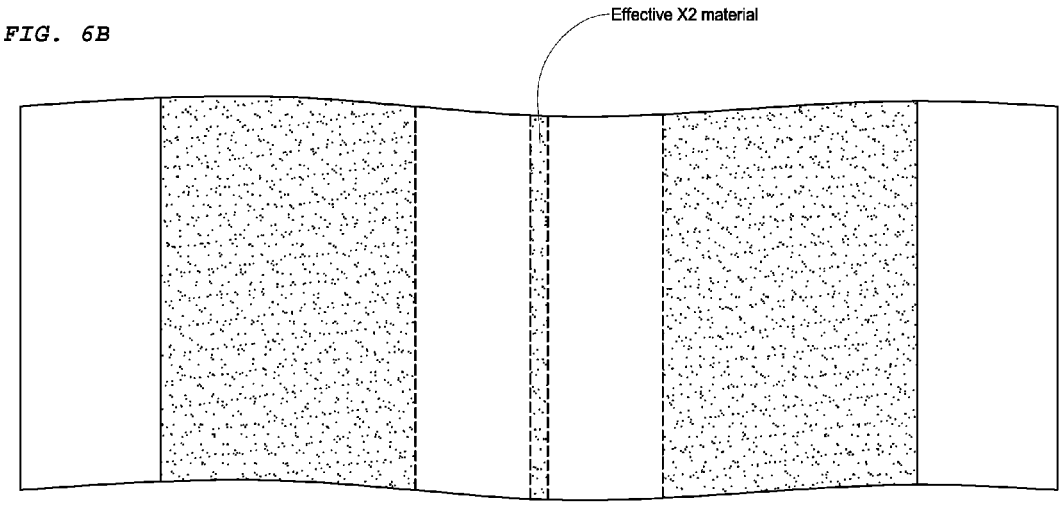
FIG. 6

US 8,340,486 B1

EFFECTIVE $\chi^2$ ON THE BASIS OF ELECTRIC BIASING OF $\chi^3$ MATERIALS

CROSS-REFERENCE TO RELATED APPLICATIONS

This application claims priority to and the benefit of copending U.S. provisional patent application Effective χ2 on the Basis of Electric Biasing of χ3 Materials Ser. No. 61/268,187, filed Jun. 9, 2009, which is incorporated herein by reference in its entirety.

FIELD OF THE INVENTION

The invention relates to optical devices employing nonlinear optical materials.

BACKGROUND OF THE INVENTION

The field of nonlinear optics is extremely rich in results, and has been around for many years. Basically the premise of nearly all measurements in the field is that one introduces a sufficiently high power flux (or "fluence," a term of art) in an optical material, it is often possible to excite nonlinear behavior, meaning that the properties of the material change with the input optical power. This kind of effect is very often described through the use of, for instance, Chi² ($\chi^2$) and Chi³ ($\chi^3$) which are material dependent constants that describe the strength of two of the relevant nonlinear optical activities of a material. Some nonlinearities, which are material dependent, will work at the full optical frequency, while others are slower. Recently, engineered organic materials have begun to be used for nonlinear optics, because they can be designed to have extremely large $\chi^2$ and $\chi^3$ moments.

SUMMARY OF THE INVENTION

In one aspect, the invention relates to a method for controlling the nonlinear moments of a nonlinear optical material of an electrooptical device. The method includes controlling an optical mode region of the electrooptical device by providing a time varying signal to the electrooptical device via one or more electrodes of the device and affecting the nonlinear moments of the nonlinear optical material of the electrooptical device by providing a time independent bias to the device. In one embodiment, the nonlinear optical material includes a $\chi^3$ material. In another embodiment, the method includes employing the time independent bias to bias the $\chi^3$ material such that the $\chi^3$ material behaves in a manner analogous to a $\chi^2$ material. In yet another embodiment, the method includes employing the time independent bias to dynamically bias the nonlinear optical material. In yet another embodiment, the method includes employing the time independent bias to dynamically phase match the nonlinear optical material and an optical signal. In yet another embodiment, the method includes controlling a multi-wave process via the electrooptic device and employing the time independent bias to control the effective index of optical signals in the multi-wave process. In one embodiment, the time independent bias includes a DC bias of 50V or more. In another embodiment, the step of affecting the nonlinear moments further includes providing the time independent bias via the one or more electrodes used for providing the time varying signal.

In one embodiment, an electrooptical device is configured to perform the aforementioned method for controlling the nonlinear moments of the nonlinear optical material. In one embodiment, the electrooptical is configured to perform at least one of electrooptic modulation or difference frequency generation. In another embodiment, the electrooptical device includes a slot waveguide having a slot region and being arranged to provide a DC field of at least 1×10⁸ V/m in the slot region. In one embodiment, the nonlinear optical material is a $\chi^3$ material that covers the slot region of the slot waveguide.

In another embodiment, a controller is configured to perform the aforementioned method for controlling the nonlinear moments of the nonlinear optical material. In one embodiment, the controller is arranged to provide the time varying signal to the electrodes via one or more signal paths between the controller and a slot region of the electrooptical device, and the controller is further arranged to provide the time independent bias via the one or more signal paths. In another embodiment, the controller is further arranged to provide dynamic phase matching between the optical signal and the nonlinear optical material. In one embodiment, the controller and the electrooptical device are located on the same chip.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 2 shows a closer view of the optical mode in the slotted waveguide shown in FIG. 1 panel B, according to principles of the invention;

FIG. 4 shows a diagram and an SEM image of the polymer clad ridge waveguide, used in FIG. 3, according to the principles of the invention;

FIG. 5 shows modal patterns for the fundamental TM and TE modes and a plot of the effective indexes for one embodiment of a ridge waveguide, according to the principles of the invention;

FIGS. 6A and 6B show, respectively, a cross-sectional and a corresponding top plan view of an electrooptical device that is configured to control an optical mode region and to affect the nonlinear moments of a nonlinear optical material, according to the principles of the invention.

DETAILED DESCRIPTION OF THE INVENTION

Figure 1:
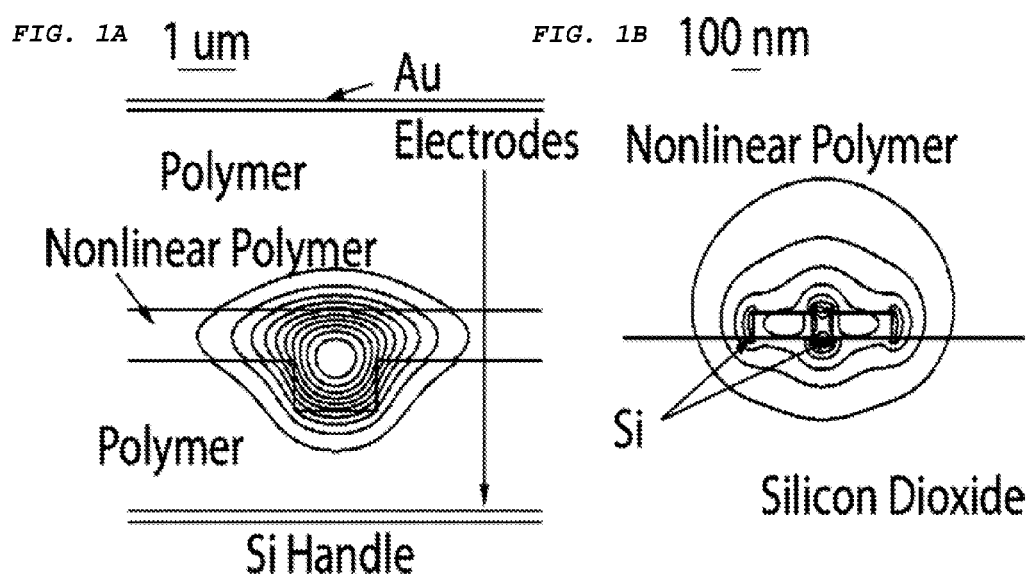
FIG. 1 shows a diagram of waveguides suited for use in electrooptic modulators, according to the principles of the invention.

We describe hereinbelow method, devices, and systems for controlling the nonlinear moments of a nonlinear optical material of an electrooptical device. We begin with a brief technology overview followed by a description of exemplary methods, devices, and systems according to principles of the invention.

Nonlinear optical polymers can provide a unique and powerful platform for building a number of useful optical devices. Traditionally, they have been used in all-polymer waveguiding systems, which have had a number of severe practical limitations. Silicon has recently become a popular material for integrated optical systems, but it lacks strong nonlinear properties. By combining nonlinear optical polymer claddings and silicon waveguides in a hybrid system, we show that a number of significant advantages are obtained. In particular, fabrication can be done using conventional CMOS processing, with the polymer added as part of back-end processes (after all of the high-temperature processing is completed), and the waveguide structure can also serve as an ultracompact set of electrodes. We also describe the use of second-order nonlinear polymers with silicon for parametric amplification and oscillation.

Unlike many conventionally used optical gain elements, such as erbium doped fiber amplifiers, the wavelength of nonlinear polymer based gain elements are limited only by the material absorption and guiding abilities of the waveguide system.

A number of advances in both design and synthesis of nonlinear optical polymer material systems have been previously achieved. Polymers with a second-order optical nonlinearity, with $r_{33}$ values of 200 μm/V, have been demonstrated. This $r_{33}$ is around an order of magnitude larger than that of many conventional nonlinear optical materials, like lithium niobate, which has an $r_{33}$ of 30 μm/V. Third-order nonlinear optical polymers have also been synthesized, with Kerr coefficients of $7\times10^{-14}$ cm$^2$/W, around twice that of silicon. At the same time, great advances have been made in the field of silicon photonics; low-loss waveguides, high-Q resonators, and electrically pumped all-silicon modulators have been built into chip-scale systems.

Nonlinear optical polymers and silicon waveguides can be combined to provide a hybrid platform with unique advantages. The nonlinear polymer can provide a flexible source of large second- and third-order optical nonlinearities. At the same time, the silicon can provide tight optical confinement due to its high index of refraction and optically invisible electrical contacts to the active regions. Moreover, fabrication technology for silicon is quite advanced due to the significant investments made by the silicon microelectronics industry. It is likely that a silicon-polymer hybrid system will prove to be an attractive platform for a number of optical devices, including integrated optical parametric oscillators, broad-band optical amplifiers, low-$V_\pi$ modulators, and all-optical switches. Additional details are provided in Baehr-Jones et al., "Polymer Silicon Hybrid Systems: A Platform for Practical Nonlinear Optics," *J. Phys. Chem. C* 112, 8085 (2008), hereby incorporated by reference herein in its entirety.

Silicon Photonics

The low-loss properties of crystalline silicon in the near-infrared have been known for decades. Over the past several years, in particular, the field of silicon photonics has witnessed significant growth. For linear optics, silicon waveguides have proven extremely versatile, in that advanced lithographic and processing techniques have enabled feature sizes as small as 40 nm to be realized and Q values of 300 k to be obtained. This has been achieved, moreover, in planar, lithographic processes that are compatible with commercial silicon foundries, suggesting that manufacturing costs in quantity will be very modest. Modulation at speeds up to 10 GBit/sec has also been demonstrated on the basis of the free-carrier plasma dispersion effect, with $V_\pi$ values of 1.8 V obtained. Surprisingly, even all-silicon photodetection at high speeds is possible through the introduction of specifically tailored lattice defects.

Silicon-based nonlinear optics is a young field. This is largely due to the absence of an appreciable second-order nonlinearity due to inversion symmetry in the silicon lattice. Attempts have been made to strain the silicon layer in order to achieve second-order nonlinearities, but these experiments have not resulted in a large $r_{33}$ value nor any practical devices to date. While parametric gain has been achieved through third-order optical nonlinearities in silicon, the requisite pump powers are extremely large, around 11 W. These high power levels, which are well in excess of the damage threshold of silicon waveguides, require that devices be operated in pulsed mode and greatly limit the devices' utility. The picture is similar for Kerr-effect-based all-optical switches; the amount of gate optical power needed for π radians of phase shift, which we will refer to as $P_\pi$, is typically on the order of 100 W. While lower switching powers have been obtained through the use of two-photon absorption (TPA) to generate free carriers, these devices are not ultrafast, with bandwidth limitations of around 1 GHz or less.

Nonlinear-Polymer-Based Modulators

The most familiar application of nonlinear optical polymers is electrooptic modulation. Nonlinear polymer modulators are based on the Pockels effect, in which an electric field changes the refractive index of a poled material, generally for near-infrared radiation. Mach-Zehnder modulators and ring modulators can both be built on this principle. Waveguides are generally built by performing photolithography on a series of different polymer materials, creating a multilayer, low index contrast guiding system. Nonlinear-polymer-based devices have conventionally been built using multilayer photolithographic processes in all-polymer systems with metal electrodes. FIG. 1 shows a diagram of waveguides suited for use in electrooptic modulators. Panel A shows the diagram of a nonlinear polymer waveguide, fabricated in an all-polymer system. Three layers of polymer are used; the middle layer is a nonlinear polymer that will shift in response to an electric field. The modal pattern for the fundamental TM mode near 1.55 um is also shown; contours of |Ey| are plotted. Electrodes are provided by the two gold layers; a field can be induced vertically and thus shift the effective index of the waveguide. Panel B shows a modulator built with similar polymers but in a silicon system; in this case, a slot waveguide is used to provide both a waveguide and a set of electrodes. The modal pattern for the fundamental TE mode near 1.55 um is shown, and contours in |E| are drawn.

Conventional nonlinear polymer modulators are already quite competitive with modulators based on other material systems. One of the most important characteristics of an electrooptic modulator is the $V_\pi$, or level of external voltage that is needed to induce π radians of phase shift in a Mach-Zehnder. This corresponds to switching from complete optical transmission to complete extinction. A lower value is desirable because it makes the supporting electronics cheaper and significantly reduces the amount of power that is consumed by the modulator; the on-chip power dissipation for electrooptic modulators is an important limitation toward achieving massive integration. With nonlinear polymers, $V_\pi$ values of 0.65 V have been demonstrated. For comparison, modulators based on lithium niobate, a nonlinear optical crystal, have only achieved $V_\pi$ values of around 2 V to date. Lithium niobate devices are the most common Mach-Zehnder modulators available commercially today.

Silicon-based modulators have also not reached the levels of performance exhibited by nonlinear polymer modulators, with $V_\pi$ values of only 1.8 V achieved. In Green et al., "Ultra-Compact, Low RF Power, 10 Gb/s Silicon Mach-Zehnder Modulator," *Optics Express* 15, 17106 (2007) it has been shown that a very low $V_\pi L$ value can be obtained if one offsets the switching signal with a DC bias, suggesting that improvements to this might be possible; however, these designs are predicated on a large amount of current flowing through the device, suggesting that even if lower switching voltages are obtained, power usage may remain unacceptably high. By contrast, very little current flows through a nonlinear polymer modulator, as the nonlinear polymers usually have low conductivities.

When integrated with a silicon platform, however, polymer-based modulators achieve even greater advantages. Devices are fabricated by defining a series of waveguides and optical structures on a silicon-on-insulator substrate. The polymer can then be spin coated to obtain a high-quality film. This has the advantage of requiring high-resolution lithography to be done only with silicon rather than polymer. The main device complexity in such an approach is captured in the silicon layer, which is fabricated using standard CMOS processing steps. Additional details are provided in Baehr-Jones et al., "Optical Modulation and Detection in Slotted Silicon Waveguides," *Optics Express* 13, 5216 (2005), hereby incorporated by reference herein in its entirety.

Polymer-Silicon Slot Waveguide

The integrated nonlinear polymer-silicon design involves a slot waveguide, which consists of two distinct silicon strips. As shown in FIG. 1, a TE optical mode is supported that will be concentrated largely in the slot area. This concentration is due to the sharp discontinuity from the silicon, with a refractive index near 3.48, to the polymer, with typical refractive indices from 1.5 to 1.7. Because the polymer is not very conductive, both halves of the slot waveguide can be held at different potentials. FIG. 2 shows a closer view of the optical mode in the slotted waveguide, with the region that would exhibit index shift due to different arm voltages highlighted. Additional details regarding the slotted waveguide are discussed in Wang et al., "Design and Fabrication of Segmented, Slotted Waveguides for Electro-Optic Modulation," *Appl. Phys. Lett.* 91, 143109 (2007), hereby incorporated by reference herein in its entirety. The DC field too is concentrated between the slot waveguide, precisely where the optical mode is localized. The entire voltage drop of the modulating signal then occurs over a length that can be only 0.1 µm or less. Compared to a more conventional modulator, where the voltage drop might occur over the course of 9 µm or more, as would be the case for the all-polymer design shown in FIG. 1 panel A, a modulator based on this design will clearly have a much lower driving voltage, even for otherwise equivalent polymers. Panel A in FIG. 2 shows a diagram of a slot waveguide with a contour plot of the TE optical mode near 1.55 um. The region in which the electrooptic index shift occurs due to charging the two silicon arms is highlighted. Panel B shows a SEM micrograph of a cleaved slot waveguide. The small arms that extend normally from the waveguide allow electrical contact with the two waveguide arms but are optically invisible. Note that the charges indicated on the arms are due to an applied voltage and do not imply any difference in doping concentrations; typical designs that have been used involve uniformly doped near-intrinsic silicon.

It is important to note that the silicon in this case is being used only as an optically transparent conductor and, as such, is uniformly doped near the optically active regions. As discussed in Baehr-Jones et al., "Optical Modulation and Detection in Slotted Silicon Waveguides," *Optics Express* 13, 5216 (2005), some of the inventors work in the past has involved lightly doped p-type silicon with $10^{15}$ boron/cm$^3$. The only significance of the doping level is that it decreases the resistivity compared to that of intrinsic silicon and can cause increased optical loss in high quantities.

Slot waveguides have been fabricated with low optical losses through electron beam lithography; losses of better than −4 dB/cm have been obtained. Slot waveguide modulators including polymers have also been built; ring-based modulators have been built, which exhibit tuning of 5.2 GHz/V, around five times more responsive than modulators designed with similar polymers on a nonslotted architecture. When used in a Mach-Zehnder configuration, we have previously obtained $V_\pi L$ values of around 0.5 V·cm; this suggests that $V_\pi$ values below 250 mV could be obtained in a device of several cm of length in a push-pull configuration without any improvement in material performance. A recent design study suggests that it should eventually be possible, by using the best nonlinear polymer materials available today and scaling down the slot size of the silicon guides, to obtain further improvements; slot-waveguide-based modulators with $V_\pi$ values of 10 mV or less should be possible, an improvement over current typical $V_\pi$ values by nearly 2 orders of magnitude. Additional details are discussed in Hochberg et al., "Towards a Millivolt Optical Modulator with Nano-slot Waveguides," *Optics Express* 15, 8401 (2007), hereby incorporated by reference herein in its entirety.

Nonlinear Polymer all-Optical Modulators

Figure 3:
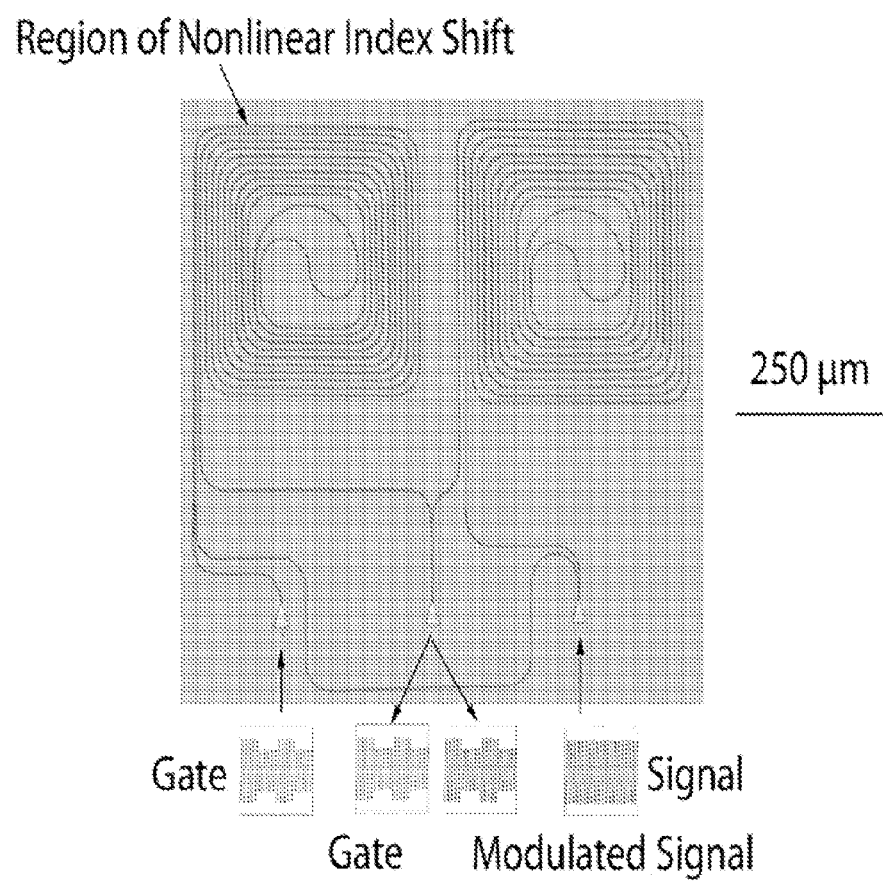
FIG. 3 is a diagram of a nonlinear all-optical modulator, according to principles of the invention.

All-optical modulators built in silicon have been the subject of increased interest. Such devices are usually built based on a Mach-Zehnder geometry; a signal optical mode goes through both arms, and a gate optical mode is introduced into one of the arms. FIG. 3 is a diagram of a nonlinear all-optical modulator. The optical micrograph is of a typical realization in a silicon ridge waveguide for radiation near wavelength 1.55 µm. The spooled arms are approximately 1 cm in length. As illustrated in FIG. 3, a nonlinear refractive index shift in one of the arms can then lead to all-optical modulation, whereby the gate optical mode can switch the signal optical mode. The gate and signal optical modes can be at any frequencies that are guided by the waveguides, as long as they are far enough apart to be distinguished. In most realizations, the nonlinear polymer would be deposited on both arms of the all-optical modulator; nonlinear cross talk would only occur in one waveguide since the gate optical mode only propagates in one arm. Such devices could someday form the basis for efficient all-optical wavelength conversion or even the basis for an all-optical logic system. Depending on the nonlinear mechanism, the operating bandwidth can be as high as the terahertz. Additional details are discussed in Hochberg, et al., "Terahertz All-Optical Modulation in a Silicon-Polymer Hybrid System," *Nat. Mater.* 5, 703 (2006). The particular device shown in FIG. 3 relies on a 0.5×0.1 µm silicon ridge waveguide, which is shown in FIG. 4. Panel A of FIG. 4 shows a diagram of the polymer clad ridge waveguide, with a contour plot of the fundamental TE mode. Panel B shows a SEM image of a cleaved waveguide.

By analogy to the $V_\pi$ value reported for the electrooptic modulator, it is possible to characterize the response strength of an all-optical modulator in terms of $P_\pi$, the instantaneous power required to obtain an induced π radians of phase shift in one arm. Lower values for $\pi_\pi$ are better as they correspond to more responsive modulators that require less gate power. Nearly all optical waveguides have a certain amount of optical power that can be tolerated (a damage threshold); higher values than this lead to device breakdown, often due to the effects of heating. Achieving lower $P_\pi$ values is an important step toward practical all-optical modulators since it is desirable to build devices that can function with continuous-wave optical inputs.

One approach to lowering the $P_\pi$ is to use a nonlinear material with a stronger response. Nonlinear polymers show significant promise in this area; ultrafast nonlinear coefficients double that of silicon have already been demonstrated. In fact, polymers with around 10 to 100 times the third-order nonlinear coefficient of silicon are likely to be demonstrated.

In addition to selecting a stronger material, the nonlinear response of a device can be enhanced by concentrating the optical modes into a smaller propagation area. In such a situation, a larger electric field will be induced by the optical mode, which will, in turn, lead to a larger shift in the nonlinear material. The amount of all-optical modulation obtained in a waveguide can be written as:

$$\Delta\varphi = k_0 \left(\frac{3}{4}\chi^3 \frac{Z_0}{n^2}\right) \frac{P}{A_{\text{eff}}} L \quad (1)$$

$$A_{\text{eff}} = \frac{Z_0^2 \left(\int 2\text{Re}(E \times H^*) dA\right)^2}{4n^2 \int E_x^4 + E_y^4 + E_z^3 dA}$$

Here, $A_{\text{eff}}$ is the effective area for the optical modes involved, the E and H fields are for the modal patterns, and L is the length. In a standard fiber optic cable with a mode field diameter on the order of 10 µm, the effective area would be approximately 100 µm². However, a ridge silicon waveguide with dimensions of 0.5×0.1 µm, such as that shown in FIG. 4, will have an effective area for a nonlinear cladding close to 0.2 µm²; this implies that for identical nonlinear materials and optical powers, the phase shift due to all-optical modulation would be increased by a factor of 500 for a given interaction length.

Utilizing this silicon-polymer hybrid geometry, we have previously demonstrated an all-optical modulator with terahertz bandwidth. A $P_\pi$ of 2 W was obtained and discussed in more detail in Hochberg, et al., "Terahertz All-Optical Modulation in a Silicon-Polymer Hybrid System," *Nat. Mater.* 5, 703 (2006). By contrast, in all-silicon devices, typical values were obtained for an ultrafast $P_\pi$ range from 50 to 100 W. As nonlinear polymers continue to increase in strength, they can be easily integrated into the polymer-silicon hybrid system used devices. It is likely that $P_\pi$ values of less than 1 W will eventually be possible, even without resonant enhancement.

Nonlinear Polymer Optical Amplifiers and Parametric Oscillators

A significant goal for silicon photonics is the development of optical amplifiers and lasers for the near-infrared. A number of advantages can be obtained by using a nonlinear polymer cladding with a silicon waveguide system. The most important benefit is the additional nonlinearity available from the polymer as compared to the nonlinearity from silicon alone. The $\chi 2$ moment that can be obtained from nonlinear polymers is quite large; an $r_{33}$ of 200 pm/V corresponds to a $\chi 2$ moment of around $8.3 \times 10^{-10}$ m/V. The induced nonlinear polarization moment for a $1 \times 10^7$ V/m electric field, typical for the 0.5×0.1 µm silicon ridge waveguides described here is then $8.3 \times 10^4$ V/m. By contrast, the $\chi 3$ moment of silicon is $1.7 \times 10^{-19}$ m² V⁻², corresponding to an induced nonlinear polarization of only 170 V/m. This analysis presumes, of course, that the $r_{33}$ encountered for electrooptic modulation is, in fact, an ultrafast effect. The polymer response bandwidth has been shown with conventional modulators to be at least 165 GHz. Through optical rectification, however, it has been established that at least some nonlinear polymers do show a relatively flat $r_{33}$ value to even the optical frequency, as discussed in Baehr-Jones et al., *Optics Express*, "Optical Modulation and Detection in Slotted Silicon Waveguides," 13 5216 (2005).

As discussed in Yariv, *Quantum Electronics,* 3rd ed. New York: Wiley, 1988, equation 2 below predicts the gain coefficient available for a waveguide with a second-order nonlinearity.

$$g = \chi^2 \varepsilon_0 4 \left(\frac{P_{\text{pump}}}{A_{\text{eff}}} w_{\text{signal}} w_{\text{idler}}\right)^{1/2} \frac{1}{(2n)^{3/2}} Z_0^{3/2} \quad (2)$$

$$A_{\text{eff}} = \frac{Z_0^3}{(2n)^3} \left(\frac{\left(\int 2\text{Re}(E \times H^*) \cdot z dA\right)^{3/2}}{\int E_{\text{signal}}^* E_{\text{pump}} E_{\text{idler}}^* dA}\right)^2$$

As for the third-order nonlinearity, a smaller effective area leads to a larger nonlinear effect and, in this case, higher gain. Typical effective areas for a second-order nonlinear process in a ridge silicon waveguide will be around 0.5 µm². In this case, the approximate gain coefficient for parametric gain in a $\chi 2$ nonlinear polymer with signal and idler near 3 µm would be 104 cm⁻¹ W⁻¹/² for a polymer with $r_{33}$ of 200 pm/V, implying that a gain of 1 dB/cm could be obtained with only 10 µW of optical power in the pump beam. Note that the gain coefficient in the case of a second-order nonlinearity depends on the square root of the optical power, in contrast to the Raman gain coefficient reported previously.

Clearly, a large amount of optical gain can potentially be obtained with a far lower power pump beam through the use of nonlinear polymers than can be obtained with the Raman effect. This can be used as the basis for optical amplifiers with very low pump power. However, another significant advantage is the intrinsically broad-band nature of the nonlinear polymer response. Unlike the Raman effect, no resonance is involved with the parametric gain process in a $\chi 2$ polymer. As a result, in principle, a single pump wavelength could be used to provide optical gain to signals at a wide array of frequencies. Similar to a conventional material with optical gain, when the gain exceeds the loss in a polymer system, spontaneous emission is then amplified, and coherent output can be created through the use of a resonator. With a nonlinear optical system, such a device is known as an optical parametric oscillator (OPO).

The threshold of such a device depends heavily on the waveguide loss that is present. The lowest threshold Raman lasers have been built into systems with waveguide losses of 0.2 dB/cm and achieve a threshold of 26 mW. If losses of 5 dB/cm were obtained with a polymer-silicon waveguide system with the previously calculated gain, then the threshold for a nonlinear polymer-based OPO with an $r_{33}$ of 200 pm/V could be around 130 µW, even if no substantial resonant enhancement of the pump is assumed. Of course, lowering the waveguide losses toward the level obtained in the silicon system would lower the threshold power as well.

Effective $\chi^2$ Due to Electric Bias Field

One issue with $\chi^2$ materials is that material processing is substantially more difficult than with $\chi^2$ materials, due to the fact that the $\chi^2$ material must be poled, that is, the nonlinear moments of the microscope constituent material must be oriented in a particular direction.

According to principles of the invention, we describe methods, devices, and systems for affecting the nonlinear moments of nonlinear optical material. Embodiments of such methods, devices, and systems may be incorporated into the structures, devices, and systems described above as well into other structures, devices, and systems.

In one embodiment, we describe a way to create an "effective" $\chi^2$ material from a $\chi^3$ material through the use of a DC bias. $\chi^3$ materials have a nonvanishing second order moment in the Taylor expansion relating the nonlinear polarization field to the applied electric field. These optical materials exhibit a nonlinear respond due to the following relationship:

$$P=\epsilon_0(\epsilon E+\chi^3 E^3)$$

A third order nonlinear response has typically been used for all-optical modulation, four-wave mixing, and other processes. Often, a simple scalar relationship such as is found in the above relationship will hold for a particular component of the electric field, but a more general tensor relationship can also hold.

Materials that exhibit a $\chi^2$ effect have typically been used for electrooptic modulation and difference frequency generation. The fundamental relationship governing such a material is:

$$P=\epsilon_0(\epsilon E+\chi^2 E^2)$$

Consider now the behavior of a $\chi^3$ material, as described above, in the presence of a very strong DC field.

$$P=\epsilon_0(\epsilon E+\chi^3 E_{DC} E^3)$$

Here, E is now the optical field, while $E_{DC}$ is the DC electric field induced on the material from an external, time independent bias. Note that this material now behaves quite similar to the behavior of the $\chi^2$ material described above. The affected $\chi^3$ material can be used for electrooptic modulation, or any other application that $\chi^2$ materials might be used with.

FIGS. 6A and 6B show, respectively, a cross-sectional and a corresponding top plan view of an electrooptical device 100. In particular, the electrooptical device 100 is configured to control an optical mode region and to affect the nonlinear moments of a nonlinear optical material in the slot region of the electrooptical device 100. In the embodiment of FIGS. 6A and 6B, the electrooptical device is a slot waveguide having a slot region. In other embodiments, however, other types of electrooptical devices may employ the principles of the invention.

Slot waveguides have recently been used to achieve exceptionally low drive voltage $\chi^2$ based modulators. The electrodes of the slow waveguide, in addition to providing a time varying signal for modulation, can also be held at a constant voltage offset, to induce a DC field.

A controller/voltage source can be coupled to electrodes for providing the DC bias. The electrodes may be electrically coupled to the slot region via conductive regions or conductive arms between the electrodes and the slot region. In one embodiment, a controller can be arranged to provide a time varying signal for controlling the optical mode region and a time independent bias for affecting the nonlinear moments of a nonlinear optical material. In another embodiment, a controller can employ the same signal paths between the controller and the slot region for providing the time dependent bias and the time independent bias.

Processor-readable (executable) storage media can be employed to automatically or semi-automatically control the application of the time varying signal(s) and/or the time independent signal(s) based on feedback from the electrooptical device 100 and/or manual input. Processor-readable storage media that can be employed by the controller include electronic, magnetic and/or optical storage media. As is known to those of skill in the processor-readable storage media arts, new media and formats for data storage are continually being devised, and any convenient, commercially available storage medium and corresponding read/write device that may become available in the future is likely to be appropriate for use. Also, it is understood that memory used by the controller can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. In one embodiment, portions of the controller or the entire controller may be located on the same chip as the electrooptical device 100.

Figure 7:
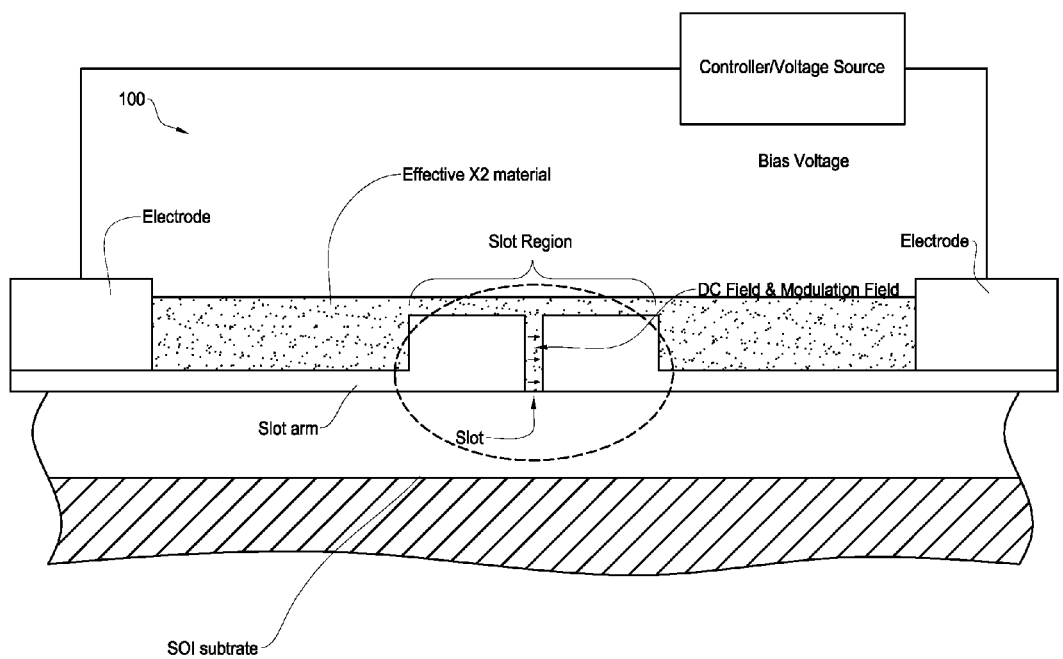
FIG. 7 shows a diagram of another embodiment of an electrooptical device that is configured to control an optical mode region and to affect the nonlinear moments of a nonlinear optical material, according to the principles of the invention.

Embodiments of the electrooptical device 100 can be built for optical radiation with free space wavelength ranging from 1400-1600 nm. This structure could be part of a Mach-Zehnder modulator, and could be part of a telecommunications system, for example. The structure could also be part of a ring oscillator or other structure. Also, embodiments of the electrooptical device 100 may have a variety of other configurations. For example, FIG. 7 shows a configuration with slot arms for providing a conductive path between the slot arms and the slot region.

Embodiments of the affected $\chi^3$ material can create very strong, "effective" $\chi^2$ materials. For example, silicon has a $\chi^3$ moment on the order of $10^{-19}$ (m/V)$^2$. Taking the breakdown voltage for the material to be on the order of $5\times10^8$ V/m, which is close to the breakdown field of fused silica, then even using silicon, a relatively weak $\chi^3$ nonlinear optical material, a $\chi^2$ moment of $5\times10^{11}$ (m/V) is obtained. This corresponds to a $\chi^2$ material with an r33 value of 11 pm/V, close to the strength of Lithium Niobate, a commonly used $\chi^2$ material. $\chi^3$ nonlinear materials that are several orders of magnitude more nonlinear are possible, which result in r33 values of 1000 pm/V or higher, which is superior to the present state of the art.

Note that these high fields do not necessarily require a large voltage. If a 100 nm slot is used, then the $5\times10^8$ V/m field can be obtained with a DC bias of 50V, which can be easily obtained. Depending on the slot configuration, other field strengths can be obtained, such as a field strength of $1\times10^8$V/m.

One substantial benefit to this approach is the ability to provide dynamic phase matching. A problem in nonlinear optics is that several of the waves involved in a multi-wave process will often have different effective indices. This causes phase mismatch to build up over time and prevents optimal nonlinear optical performance from being obtained. With the inventive biasing approach, the orientation and the periodicity of the "effective" $\chi^2$ material can be changed dynamically without the need for new materials processing. This can enable a nonlinear optics device to be tunable over a wider range of frequencies.

In some embodiments of the invention the optical devices are implemented in a silicon-on-insulator (SOI) configuration. Silicon is a useful material because of its low cost as compared to many other semiconductors, and because it has a very well developed and well understood processing technology. Nevertheless, other semiconductor materials might in principle be used instead of silicon in an electrooptic polymer semiconductor waveguide optical amplifier. For some optical wavelengths, other materials might be advantageous as compared to silicon. In alternative embodiments, amorphous silicon and other semiconducting materials including various crystalline and non-crystalline III-V semiconductor compounds, such as GaAs, GaAs/AlGaAs, InP, and the like can be used to implement an electrooptic polymer semiconductor waveguide optical amplifier according to the principles of the invention. In these materials, the wavelength for optical radiation transmitted through the waveguide can also be different and includes but is not limited to NIR, MIR and FIR such as radiation in the bands 1310 nm, 1490 nm, and the range of 1 μm to 30 μm.

In optical communication systems, modulated optical signals can be used to encode a digital signal as a series of intensity pulses. The optical signals used are typically near 1550 nm in free space wavelength, but other wavelengths are possible. For example, commercial fiber optic-based telecommunication systems use signals in the vicinity of 1310 nm, 1490 nm and 1550 nm. In coarse wavelength division multiplexing (CWDM), a channel spacing grid using the wavelengths from 1270 nm through 1610 nm (revised to 1271 nm to 1611 nm) as center wavelengths with a channel spacing of 20 nm is an agreed ITU standard. Dense wavelength division multiplexing (DWDM) is another system used for standardized optical fiber-based telecommunication. In standard commercial systems, optical signals are converted to electrical signals for modulation, and are then converted back to optical signals for transmission. All optical operation such as the electrooptic polymer semiconductor optical gain element of the present invention has advantages in terms of ease of use and speed of processing.

In operation the magnitude of the intensity modulation of the transmitted radiation is sufficient to distinguish a 1 in a digital data stream from a 0 in the digital data stream. By way of example, in various telecommunication systems that operate according to standards set by the ITU or other standard setting bodies, the signal defining a 1 and the signal defining a 0 in the data stream are specified as to their characteristics, which are published so that systems built and/or operated by different vendors can communicate with each other. It is contemplated in this disclosure that the magnitude of the signal variation associated with the modulation will depend on the implementation details of the modulator as part of a specific telecommunications or data processing environment, and that to be effective, the modulator will have to provide signals that are compatible with the associated standards. While the input data stream is described as digital data, the voltages applied across the pairs of electrical contacts can be digital in nature, or can be analog voltages. In the situation where one member of an electrical contact pair is connected to a reference signal or voltage (for example ground potential, "zero volts," or some other fixed potential) a signal representing a differential voltage relative to the reference voltage can be applied to only the second electrical contact, and that signal can be effective to control the poling. The differential signal can in principle vary above and/or below the reference voltage.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. A method for controlling the nonlinear moments of a nonlinear optical, polymer cladding, $\chi^3$ material of an electrooptical device, the method comprising:
   controlling an optical mode region of the electrooptical device by providing a time varying signal to the electrooptical device via one or more electrodes of the device;
   affecting the nonlinear moments of the nonlinear optical material of the electrooptical device by providing a time independent bias to the device; and
   employing the time independent bias to bias the nonlinear optical material such that the material behaves in a manner analogous to a $\chi^2$ material.

2. The method of claim 1, wherein the nonlinear optical material exhibits a nonzero $\chi^3$ moment, and wherein the method further comprises employing the time independent bias to bias the nonlinear optical material such that the nonlinear optical material behaves in a manner analogous to a $\chi_2$ material.

3. The method of claim 1, further comprising employing the time independent bias to dynamically change the nonlinear behavior of the nonlinear optical material.

4. The method of claim 1, further comprising employing the time independent bias to dynamically phase match the nonlinear optical material and an optical signal.

5. The method of claim 4, further comprising:
   controlling a multi-wave process via the electrooptic device; and
   employing the time independent bias to control the effective index of optical signals in the multi-wave process.

6. The method of claim 1, wherein the time independent bias includes a DC bias of 50V or more.

7. The method of claim 1, wherein affecting the nonlinear moments further includes providing the time independent bias via the one or more electrodes used for providing the time varying signal.

8. An electrooptical device configured to perform the method of claim 1.

9. The electrooptical device of claim 8, wherein the device is further configured to perform at least one of electrooptic modulation or difference frequency generation.

10. The electrooptical device of claim 8, further comprising a slot waveguide, wherein the slot waveguide includes a slot region, and wherein the slot waveguide is arranged to provide a DC field of at least $1\times10^8$ V/m in the slot region.

11. The electrooptical device of claim 10, further comprising a Mach-Zehnder modulator that includes the slot waveguide.

12. The electrooptical device of claim 10, further comprising a ring modulator that includes the slot waveguide.

13. A controller configured to perform the method of claim 1, wherein the controller is arranged to provide the time varying signal via one or more signal paths between the controller and a slot region of the electrooptical device, and wherein the controller is further arranged to provide the time independent bias via the one or more signal paths.

14. The controller of claim 13, wherein the controller is further arranged to provide dynamic phase matching between the original signal and the nonlinear optical material.

15. The controller of claim 13, wherein the controller and the electrooptical device are located on the same chip.

* * * * *